United States Patent
Wu et al.

(10) Patent No.: US 10,033,048 B2
(45) Date of Patent: Jul. 24, 2018

(54) THIN FILM BATTERY

(75) Inventors: Han Wu, Barrington, IL (US); Stefan Pfrommer, Eiken (CH)

(73) Assignee: RENATA AG, Itingen (CH)

( * ) Notice: Subject to any disclaimer, the term of this patent is extended or adjusted under 35 U.S.C. 154(b) by 73 days.

(21) Appl. No.: 13/061,844

(22) PCT Filed: Sep. 5, 2008

(86) PCT No.: PCT/EP2008/061816
§ 371 (c)(1),
(2), (4) Date: Apr. 18, 2011

(87) PCT Pub. No.: WO2010/025773
PCT Pub. Date: Mar. 11, 2010

(65) Prior Publication Data
US 2011/0189528 A1 Aug. 4, 2011

(51) Int. Cl.
*H01M 6/02* (2006.01)
*H01M 6/00* (2006.01)
(Continued)

(52) U.S. Cl.
CPC ......... *H01M 6/005* (2013.01); *H01M 2/0207* (2013.01); *H01M 2/027* (2013.01);
(Continued)

(58) Field of Classification Search
CPC .... H01M 2/0207; H01M 2/0267; H01M 2/08; H01M 6/02; H01M 2/02; H01M 2/0275;
(Continued)

(56) References Cited

U.S. PATENT DOCUMENTS 3,907,599 A * 9/1975 Fanciullo et al. ............ 429/152
5,004,655 A * 4/1991 Symanski ....................... 429/82
(Continued)

FOREIGN PATENT DOCUMENTS

EP 0 691 695 A1 1/1996
JP 60-131752 A 7/1985
(Continued)

*Primary Examiner* — Lisa S Park
(74) *Attorney, Agent, or Firm* — Sughrue Mion, PLLC

(57) ABSTRACT

The present invention concerns a flat battery comprising a package formed by a cathode, an anode, and a separator layer sandwiched between the cathode and the anode, a sealing frame extending circumferentially around said package, a first current collector contacting the anode, and a second current collector contacting the cathode. The first and second current collectors each partly cover the sealing frame in a zone being adjacent to the package. According to the invention, the battery further comprises a first polymeric jacket layer being arranged on the first current collector and a second polymeric jacket layer being arranged on the second current collector, said first and second polymeric jacket layers extending circumferentially beyond the current collectors and beyond the sealing frame and being sealed together to form an outer jacket for the battery. Furthermore, the present invention also concerns a method to produce such a battery.

12 Claims, 2 Drawing Sheets

(51) Int. Cl.
*H01M 2/02* (2006.01)
*H01M 2/08* (2006.01)
*H01M 6/40* (2006.01)

(52) U.S. Cl.
CPC ....... *H01M 2/0212* (2013.01); *H01M 2/0215* (2013.01); *H01M 2/0267* (2013.01); *H01M 2/0275* (2013.01); *H01M 2/0277* (2013.01); *H01M 2/08* (2013.01); *H01M 6/40* (2013.01); *Y10T 29/4911* (2015.01); *Y10T 29/49114* (2015.01); *Y10T 29/49115* (2015.01)

(58) Field of Classification Search
CPC .... H01M 2/0491; H01M 2/0482; H01M 6/40; H01M 10/0485; H01M 10/126; H01M 6/005; H01M 2/0277; H01M 2/027; H01M 2/0215; H01M 2/0212; Y10T 29/49115; Y10T 29/4911; Y10T 29/49114
See application file for complete search history.

(56) References Cited

U.S. PATENT DOCUMENTS

| | | |
|---|---|---|
| 5,989,751 A | 11/1999 | Cotte et al. |
| 6,752,842 B2 | 6/2004 | Luski et al. |
| 2003/0228517 A1 | 12/2003 | Holl et al. |
| 2005/0239917 A1 | 10/2005 | Nelson et al. |
| 2006/0147792 A1* | 7/2006 | Nelson et al. .................. 429/65 |

FOREIGN PATENT DOCUMENTS

| | | | | |
|---|---|---|---|---|
| JP | 01-167947 A | | 7/1989 | |
| JP | 05-325923 A | * | 12/1993 | .............. H01M 2/02 |
| JP | 11-213969 A | | 8/1999 | |

* cited by examiner (a)

(b)

THIN FILM BATTERY

BACKGROUND OF THE INVENTION

The present invention relates in general to thin film primary batteries.

Electrochemical elements, i.e. batteries, are known in many different physical forms. In most cases, they have a mechanically robust housing and are in the form of round, button or prismatic cells. A positive and a negative electrode, a separator and an electrolyte are arranged in such a cell. The housing of this type of cells is in general composed of steel, a stainless steel alloy or aluminum.

However, for certain applications very thin batteries having a flexible housing are needed. These applications include active radio frequency identification (RFID) tags, PCMCIA cards, smart cards, etc. A battery which shall be used in such applications must be flexible and compact, deliver high energy density and specific energy with a low rate of self discharge, and should be provided with a reliable sealing. The sealing is extremely important, as moisture should be prevented from entering into the battery to avoid drain and self discharge, as well as to prevent drying out resulting from loosing the organic solvents in the electrolyte, even when the battery is distorted or under mechanical stress. Furthermore, the battery should be manufacturable in a cost-efficient and reliable way.

Different thin film batteries are known from prior art, most of them using lithium as the anode material.

U.S. Pat. No. 5,989,751 for example, discloses a primary lithium battery having a flexible and compact design. The cell is provided with an electrolyte-containing composite cathode. A packaging using a spacer and polymeric sheets is provided.

US 2003/0228517 A1 shows a thin cell with a packaging being formed by two plastic sheets sealed to each other. The thin cells described in this document are stacked to form a larger electrochemical element. The plastic sheets are metallized in certain areas to form the electrical contacts with the electrodes of the cell.

US 2005/0239917 also discloses a thin film lithium battery, wherein the anode is printed on a copper current collector using lithium metal powder based ink. The anode and cathode current collectors are sealed around the perimeter of the battery by a polyester sealant frame.

U.S. Pat. No. 6,752,842 B2 discloses a thin film cell which is manufactured by printing different layers on top of each other.

In terms of quality of the sealing and cost-efficiency upon production, the above described batteries are not yet completely satisfying.

SUMMARY OF THE INVENTION

The present invention relates to a flat battery comprising a package formed by a cathode, an anode, and a separator layer sandwiched between the cathode and the anode. A sealing frame extends circumferentially around said package. The battery further comprises a first current collector contacting the anode and a second current collector made of a metal foil and contacting the cathode, wherein the first and second current collectors each partly cover the sealing frame in an area being adjacent to the package.

Said battery further comprises a first polymeric jacket layer being arranged on the first current collector and a second polymeric sheet being arranged on the second current collector, said first and second polymeric sheets extending circumferentially beyond the current collectors and beyond the sealing frame and being sealed together to form an outer jacket for the battery.

The present invention also relates to a method for making a flat battery comprising the following steps:

(a) providing a first polymeric jacket layer,
(b) providing a first current collector and arranging same on said first polymeric sheet,
(c) applying an anode material on said first current collector,
(d) providing a second polymeric jacket layer,
(e) providing a second current collector and arranging same on said second polymeric jacket layer,
(f) providing a sealing frame having an inner contour corresponding substantially to an outer contour of the anode material and the separator on the first current collector,
(g) arranging said frame on one of the current collectors, the frame covering the outer circumference of the current collector,
(h) providing a cathode material and applying same on the second current collector,
(i) providing a separator layer and arranging same on the cathode material,
(j) assembling the flat battery by returning one of the two polymeric jacket layer and arranging it and on the other polymeric jacket layer such that the separator layer is sandwiched between the cathode material and the anode material, the sealing frame then extending circumferentially around the anode material, the cathode material and the separator, and
(k) sealing together said first and second polymeric jacket layer in a zone extending circumferentially beyond the current collectors to form an outer jacket for the battery package.

The first and second polymeric jacket layers which are sealed together to form an outer jacket for the battery help to avoid that water or other liquids enter the cell and establish a conductive path which may result in high self-discharge rates. Furthermore, electrolyte is prevented from escaping the battery, and a dry-out of the battery is thereby avoided. The sealing frame extending circumferentially around the package formed by the anode, the cathode, the separator and the electrolyte, further contributes to the high quality of the sealing. Due to the fact that the sealing frame extends circumferentially around said package, while the first and second polymeric sheets extend circumferentially beyond the frame, a double sealing is provided. The current collectors partly covering the sealing frame form a first sealing zone and the polymeric sheets extending circumferentially beyond said sealing area form a second additional sealing zone.

According to a preferred embodiment of the invention, the sealing frame is coated with a heat-sealable material. The sealing frame itself can be made of a polymer such as nylon, polyester, polypropylene or any suitable polymer, in particular of PET (poly(ethylene terephthalate), a resin in the polyester family). The coating may consist of hot-melt adhesive EVA (ethylene vinyl acetate) or EMA (ethyl methyl acrylate), or another suitable heat-sealable material. Due to the coating, the frame can easily be sealed to the current collectors and the polymeric sheets. The sealing frame can also consist of two frame elements, each of these elements forming a frame itself. Typically, one such frame element will be arranged on the cathode side, and another one on the anode side during assembly of the battery, and the two frame elements will be bonded together during a final assembly step to form one frame. In case of the use of two frame elements, the separator can arranged with its circumferential edges lying between the two frame elements. It will thus be held in place by the two frame elements when they are bonded together, and any contact between the anode material and the cathode can be avoided in a very reliable and simple way.

The first and second polymeric jacket layer may also be coated with a hot-melt adhesive on the side lying on the first and second current collectors, respectively. The two polymeric jacket layer can thus be sealed together to form the outer jacket just by applying heat in a laminating operation.

The polymeric jacket layers can be simple polymeric sheets having a surface which is larger than the surface of the current collector on which it is arranged. The complete current collector will then covered by the polymeric sheets, and the jacket formed by the two polymeric sheets will thus not leave any parts of the battery accessible, except for two contact tabs.

Alternatively, the polymeric jacket layers can also be formed by a polymeric frame which will typically be cut out from a polymeric sheet, and which covers the outer contour of the current collector on which it is arranged. The use of such a frame has the advantage that the whole battery will be thinner than when complete sheets are used, and the additional sealing is limited to those areas where such a sealing is really critical, namely to the outer contour of the current collector. On the other hand, it is easier to obtain certain desired surface properties for the battery when using a whole sheet than when using merely a frame. A complete sheet might thus be the preferred solution when a certain adhesion or a certain appearance is needed.

The current collectors are preferably metal foils, in particular copper foils. Contact tabs for contacting the battery from the outside can be formed integrally with such a copper foil, and there is thus no need for additional contacts. However, the use of a metallized polymeric film or sheet instead of a metal foil is also possible. According to a preferred embodiment of the invention, at least one of the current collectors is a preformed metal foil having a depression formed in a central area thereof. Such a depression can form a receptacle for a cathode mixture when same is applied to the current collector, and will thus facilitate the assembly of the battery.

Preferably, the anode material is lithium. However, it is also possible to use another material such as zinc (Zn), cadmium (Cd), lead (Pb), hydrogen absorbing alloys or any other suitable material for the anode without departing from the scope of the present invention.

According to a preferred embodiment of the invention, the cathode comprises manganese-dioxide ($MnO_2$) as the active material. Typically, electrolytic manganese dioxide, or EMD, will be used for this purpose. However, it is also possible to use another material such as nickel hydroxide, silver oxide, carbon monofluoride or any other suitable material for the cathode without departing from the scope of the present invention.

It should further be noted that the first and the second polymeric jacket layers can be made of one single sheet which is folded in the middle to form the outer jacket and thereby seal the battery. The advantage of such a solution is that the folding line already provides one side which will be perfectly sealed.

The present invention also concerns a method to make a battery according to claim 12. Preferred embodiments of this method arise from the dependent claims and from the description of two preferred embodiments given below.

BRIEF DESCRIPTION OF THE DRAWINGS

The subject matter of the invention will be explained more in detail in the following description with reference to the drawings, wherein

FIG. 3($b$) is a top view of a second preassembled part of the flat battery of FIG. 1.

DETAILED DESCRIPTION

Figure 1:
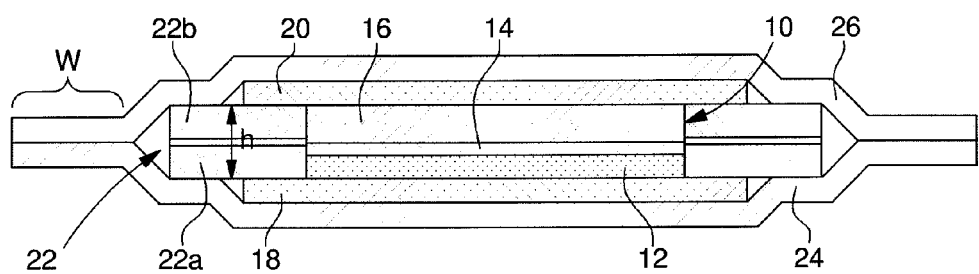
FIG. 1 is a sectional view of a flat battery according to a first embodiment of the invention.

It will be appreciated that the following description is intended to refer to two specific embodiments of the invention which have been selected for illustration in the drawings but which are not intended to define or limit the invention, other than in the appended claims.

Figure 3:
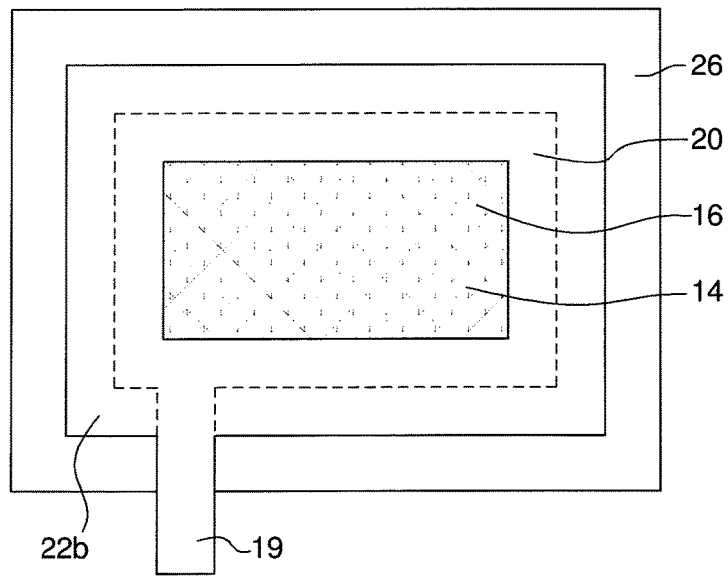
FIG. 3($a$) is a top view of a first preassembled part of the flat battery of FIG. 1.
Figure 3:
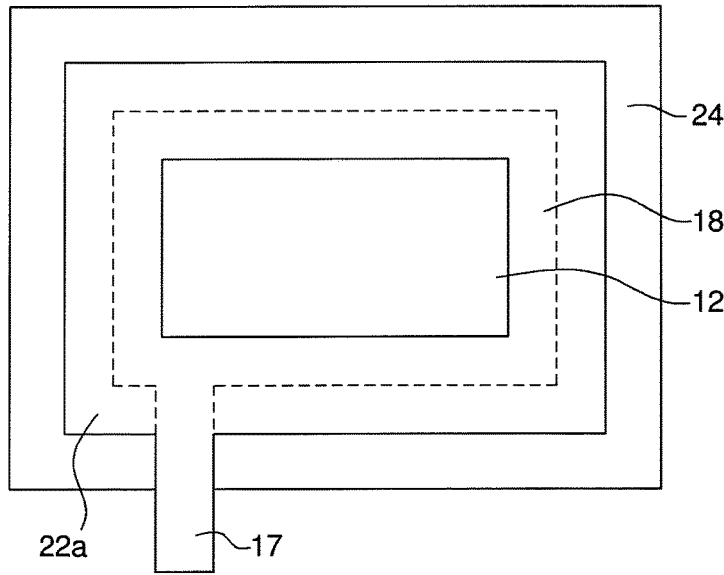

FIG. 1 shows a cross-section through a flat battery according to the invention, whereas FIGS. 3($a$) and 3($b$) each show a top view of a preassembled part of the flat battery shown in FIG. 1. More precisely, FIG. 3($a$) shows the upper layers of the battery shown in FIG. 1, while FIG. 3($b$) shows the lower layers of the same.

Referring to FIGS. 3($a$) and 3($b$), a method according to the invention to produce the battery as shown in FIG. 1 will now be described.

Firstly, the preassembly of the lower layers as shown in FIG. 3($b$) will be described.

In a first step, a first rectangular polymeric sheet 24 being coated with a heat-sealable material on one side is provided. It should be noted that, although rectangular components have been chosen for the embodiments described herein, the individual components and the assembled battery can have any desired shape, e.g. rectangular with rounded edges, oval, circular etc. A first current collector 18 is arranged on the side being coated with a heat-sealable material of said polymeric sheet 24. Said current collector 18 is made of a rectangular copper foil or another appropriate metal foil and has a perimeter which is smaller than the perimeter of the polymeric sheet 24, for example by some millimeters on all sides. On one side, it is provided with a contact tab 17 extending beyond the outer contour of the polymeric sheet 24. The current collector 18 will be arranged in the centre of the first polymeric sheet 24 such that a frame-like outer zone of the polymeric sheet 24 remains uncovered, as it can be seen in FIG. 3($a$).

In the next step, a first frame element 22a will be arranged on the first polymeric sheet 24 and the first current collector 18. This frame element is a rectangular polyester frame 22 having a thickness lying In the order of about 100 µm and being coated with hot-melt adhesive EVA (ethylene vinyl acetate) on its upper and its lower surface. The outer perimeter of this frame element 22a is smaller than the perimeter of the polymeric sheet 24, but larger than the perimeter of the current collector 18, whereas the inner perimeter of the frame element 22a is smaller than the perimeter of the current collector 18. The frame element 22a will be arranged on the polymeric sheet 24 and the current collector 18 symmetrically with respect to the center of all components, such that an inner region of the frame element 22a lies on the current collector 18, while an outer region of the frame element 22a lies directly on the polymeric sheet 24.

These three elements, i.e. the first polymeric sheet 24, the first current collector 18, and the first frame element 22a will be bonded to each other. To do so, it is sufficient to apply heat and pressure, e.g. by applying a heated block, and the hot-melt coating on the polymeric sheet and on the frame element 22a will melt and adhere to the metal foil lying in the middle. Alternatively, one can also bond these three elements together only temporarily by applying heated pins to some selected points.

In the next step, a lithium foil which will form an anode 12 is arranged on the current collector copper foil 18. This is normally done under a low moisture environment to protect the lithium. The anode lithium foil 12 is also rectangular with its surface being slightly smaller than the surface of the current collector 18. It will preferably be arranged symmetrically in the middle of the current collector 18, thereby leaving a frame-like outer region of the current collector 18 uncovered.

Now referring to FIG. 3(a), in the same manner, a second polymeric sheet 26 identical to the first polymeric sheet 24 and thus also coated with a heat-sealable material will be provided. A second current collector 20 with a second contact tab 19 will be arranged on said second polymeric sheet 26 in the same way as described above for the first polymeric sheet 24 being arranged on the first current collector 18. In a next step, a second frame element 22b identical to the first frame element 22a described above will be arranged on the on the second polymeric sheet 26 and the second current collector 20 just as described above. The second polymeric sheet 26, the second current collector 20, and the second frame element 22b will then also be bonded to each other just as described above referring to FIG. 3(a).

Once the frame element 22b lies on the copper foil forming the current collector 20 and has been bonded thereto and to the polymeric sheet 26 as described above, instead of the lithium foil forming the anode 12, a mixture which will form the cathode 16 is applied to the central zone of the current collector 20. This central zone is bordered by the frame element 22b which forms a wall to hold the mixture in place. Said mixture contains preferably manganese dioxide as the active cathode material, but other suitable cathode materials can also be chosen without departing from the scope of the present invention. In addition to the active cathode material, the mixture further comprises an electrolyte, typically a lithium salt, such as lithium perchlorate ($LiClO_4$), lithium hexafluorophosphate ($LiPF_6$), or lithium triflate ($LiCF_3SO_3$), in a mixture of aprotic organic solvents, such as PC:EC (propylene carbonate:ethylene carbonate), EC:DME (ethylene carbonate:dimethoxyethane), or EC:DMC (ethylene carbonate:dimethyl carbonate). Any other suitable electrolyte can also be used. Furthermore, the cathode mixture comprises a conductive phase to promote electrical conductance and to enhance utilization of the active material, such as conductive carbon, graphite, or another suitable material. The mixture further comprises a substance acting as binder to hold the different components together, such as PTFE (Polytetrafluoroethylene) or PVDF.

After the application of the cathode mixture forming a composite cathode 16, a porous film serving as a separator 14, e.g. a PE or PP film, as it is well known in the art, is arranged on this cathode 16. For the example shown here, the outer contour of the separator 14 corresponds to the inner contour of the two frame elements 22a, 22b. The separator can also have a bigger surface than the cathode and extend circumferentially beyond the cathode. Such a solution will in general be preferred, because it allows to avoid that the cathode and the anode contact each other. To be kept in place, the separator might be arranged between the two frame elements described above on its outer circumference.

The preassembled unit shown in FIG. 3(b) comprising the first polymeric sheet 24, the first current collector 18, frame element 22a and the anode 12 can now be assembled to the preassembled unit shown in FIG. 3(a). To do so, one of the two preassembled units will be flipped over, and the two halves will be arranged on each other such that the two frame elements 22a, 22b are aligned with each other and form one frame 22. The anode 12 is thereby brought into contact with the separator 14, the outer contours of the two polymeric sheets 24, 26 now lying on top of each other. It should be noted that it is also possible to use a frame made in one piece instead of a frame comprising two frame elements as described herein. This frame will then preferably arranged on the cathode side before the two units shown in FIGS. 3(a) and 3(b) are assembled to each other, just as it is described below for the second embodiments shown in FIG. 2.

As shown in FIG. 1, the anode 12, separator 14 and cathode 16 then form a substantially block-shaped package 10 in the heart of the battery with the frame 22 formed by the frame elements 22a, 22b circumscribing said package 10. The inner contour of the frame 22 corresponds to the outer contour of the package 10, and the height h of the frame 22 corresponds to the height h of the package 10 formed by the anode 12, the cathode 16 and the separator 14. The circumferentially outer area of the current collector 18 extending beyond the anode 12 lies on the sealing frame 22 in an area being adjacent to the package 10, i.e. in an circumferentially inner area of the frame 22, thereby partly covering said frame. As one can see in FIGS. 1 and 2, approximately half of the surface of the frame 22 is covered by the current collectors 18, 20, whereas a circumferentially outer area of the frame 22 is not covered by the current collector 18, 20 and is in direct contact with the polymeric sheets 24, 26 when the battery is assembled.

In a laminating operation the heat-melt adhesive coatings on the contact surface of the frame elements 22a, 22b are melted, such that the two frame elements 22a, 22b are now definitively bonded to form one frame 22. If this has not happened beforehand, the frame elements 22a, 22b will also be bonded to the current collectors 18, 20. At the same time, the two polymeric sheets 24, 26 being coated with a heat-sealable material on their inner sides contacting each other are sealed together on their outer circumference in an outer sealing area having a width W. The polymeric sheet 24, 26 serving as a polymeric jacket layer to form the outer jacket will typically have a thickness of 50-75 µm. This laminating operation can be limited to three sides of the battery in a first step, a fourth side being left unsealed temporarily. In this case, a vacuum will be applied in a next step to remove any air, vapor, moisture etc. from the battery. While this vacuum is applied, the fourth side will be laminated to seal the battery completely. It is also possible to seal all for sides in one step while evacuating the battery at the same time, but this is slightly more difficult to handle. As this evacuation step may take longer than the assembly steps previously described, the batteries may be grouped during evacuation and during sealing of the fourth side, even if the previous assembly steps have been carried out individually, e.g. on a rotating assembly diode or on a conveyer belt.

It should be noted that it is also possible to use only one polymeric sheet instead of two separate sheets 24, 26. In this case, the first current collector 18, the first frame element 22a, and the anode 12 will be applied on one half of this sheet as described above, while the second current collector 20, the cathode 16, the second frame element 22b and the separator 14 will be arranged on the second half just as previously described for two separate sheets 24, 26. The polymeric sheet will then be folded in the middle to assemble the battery, and one proceeds with the laminating operation as described above. One advantage of this method is that one side, namely the one which is folded, does not need to be sealed, and that it can be easier to align the two halves forming the battery with each other.

Figure 2:
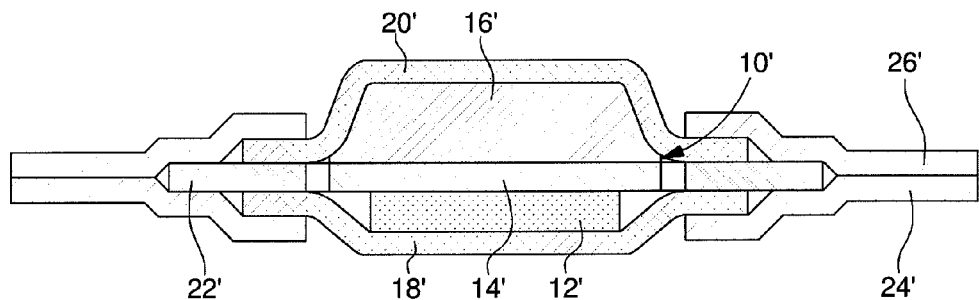
FIG. 2 is a sectional view of a flat battery according to a second embodiment of the invention.

FIG. 2 shows a second embodiment of a battery according to the invention. The same parts are denoted using the same reference numerals, and in the following only the differences with respect to the first embodiment will be described.

As one can see in FIG. 2, instead of the polymeric sheets 24, 26 shown in FIG. 1, polymeric frames 24', 26' are used. These have the same function as the polymeric sheets 24, 26 in the first embodiment. Said polymeric frames 24', 26' can be cut out in a polymeric sheet as it is used for the polymeric sheets 24, 26 of the first embodiment, and will thus also typically have a thickness of 50-75 µm. The outer contour of the polymeric frames 24', 26' shown in FIG. 2 corresponds to the outer contour of the sheets 24, 26 used for the first embodiment and shown in FIG. 1. The inner contour of the frames 24', 26' is slightly smaller than the outer contour of current collectors 18', 20', such that the outer contour of the current collectors 18', 20' is covered by the frames 24, 26' after assembly of the battery. The outer jacket formed by the two polymeric frames 24', 26' is thus not completely closed, and the current collectors 18', 20' are not covered in their center. The uncovered centre can also serve as a contact, and contact tabs as shown in FIGS. 3(a), 3(b) are thus not absolutely necessary, when a frame instead of complete sheets is used to form the jacket.

The current collectors 18', 20' are copper foils just as for the first embodiments, but the second current collector 20' has been preformed and is provided with a depression in its center. This depression forms a receptacle for the cathode mixture 16', as it can be seen in FIG. 2. The first current collector 18' can also be provided with a depression to receive the lithium foil forming the anode 12', but as the thickness of the anode is rather small compared to the thickness of the cathode, the advantages of such a depression on the lithium side are less obvious than for the depression on the cathode side forming a receptacle for the cathode mixture.

The frame 22' is not formed by two frame elements 22a, 22b as described for the first embodiment above, but is merely formed by one single frame. This frame will be arranged on the cathode side, i.e. on the second current collector 20' and polymeric frame 26' just as described above for the first embodiment, and these three parts will be bonded together before application of the cathode mixture 16'. The total thickness of the frame 22' is smaller than the thickness of the package 10' formed by the active materials and can lie somewhere between the thickness of the separator layer 14 and the thickness of the package 10. In the final laminating step, the frame 22', which is coated with a hot-meld adhesive on both sides, will be bonded to the first current collector 18' and to the polymeric frames 24', 26' forming the outer jacket.

With the embodiment as shown in FIG. 2, one can obtain a battery having a total thickness lying under the thickness one can achieve with the embodiment of FIG. 1.

One of the main advantages of the battery described herein is the multiple sealing zones. As it can be seen in FIGS. 1 and 2, a circumferentially inner part of the frame 22, 22' is sandwiched between the two current collectors 18,18', 20, 20' and is bonded to them via the melted hot-melt-adhesive coating of the frame 22, 22'. The current collectors 18, 18', 20, 20' and the frame 22 lying between them thus form a hermetically sealed "housing" protecting the package 10, 10' and thus the battery's anode and cathode from the entry of moisture.

In addition to this inner sealing provided by the frame 22, 22' sealed to the current collectors 18, 18', 20, 20', an outer sealing jacket is formed by the two polymeric jacket layers, i.e. by polymeric sheets 24, 26 in the first embodiment, or by polymeric frames 24', 26' in the second embodiment, which are sealed to each other on their outer circumference. This jacket forms an additional protection for the complete battery, including the current collectors 18, 18', 20, 20'. Furthermore, the polymeric jacket layers 24, 24', 26, 26' are also sealed to the frame 22, 22' in a region which lies circumferentially outwards of the current collectors 18, 18', 20, 20'. Finally, the polymeric jacket layers 24, 24', 26, 26' are sealed to the current collectors 18, 18', 20, 20' on the complete surface of these current collectors. Due to the low thickness of the single layers, i.e. of the polymeric jacket layers, the current collectors, the active materials as well as the frame, the whole battery will remain flexible while being perfectly sealed.

The combination of the frame sandwiched between the current collectors in a circumferentially inner region and sandwiched between the two polymeric jacket layers in an outer region with the jacket formed by these jacket layers thus provides an excellent sealing for the battery according to the invention.

REFERENCE NUMERALS 10, 10' package
12, 12' anode
14, 14' separator
16, 16' cathode
17 contact tab
19 contact tab
18, 18' first current collector
20, 20' second current collector
22, 22' frame
22a, 22b frame element
24, 24' first polymeric jacket layer
26, 26' second polymeric jacket layer
h height
W width

The invention claimed is:
1. A flat battery comprising:
a package formed by a cathode, an anode, and a separator layer sandwiched between the cathode and the anode;
a sealing frame extending circumferentially around said package;
a first current collector contacting the anode;
a second current collector contacting the cathode;
a first polymeric jacket layer arranged on the first current collector; and
a second polymeric jacket layer arranged on the second current collector,
wherein the first and second current collectors each partly cover the sealing frame in a zone adjacent to the package, whereas upper and lower surfaces of the sealing frame are partially covered by, and sealed to, the first and second current collectors as a first fluid-tight seal, respectively and whereas at least one third of the upper and lower surfaces in a length direction is not covered by the first and second current collectors and stretches horizontally in the length direction, providing the upper and lower surfaces to be in direct contact with, and sealed to, the first polymeric jacket layer and the second polymeric jacket layer as a second fluid-tight seal, wherein said first and second polymeric jacket layers extend circumferentially beyond the current collectors and beyond the sealing frame and are sealed together to form an outer jacket for the battery, wherein said polymeric jacket layers are also sealed to the upper and lower surfaces of the circumferentially outer area of the sealing frame in a region which lies circumferentially outwards of the current collectors, and wherein the first fluid-tight seal and the second fluid-tight seal provide barriers against the escape of fluid.

2. The flat battery according to claim 1, wherein the sealing frame is coated with a heat-sealable material.

3. The flat battery according to claim 2, wherein the sealing frame is made of a polymer, in particular of PET.

4. The flat battery according to claim 2, wherein the sealing frame comprises two frame elements being arranged on top of each other.

5. The flat battery according to claim 2, wherein the first and second polymeric jacket layers are coated with a hot-melt adhesive on the side lying on the first and second current collectors, respectively.

6. The flat battery according to claim 5, wherein the first and second polymeric jacket layers are polymeric sheets completely covering the current collectors on which they are arranged.

7. The flat battery according to claim 5, wherein the first and second polymeric jacket layers are polymeric frames covering an outer contour of the current collectors on which they are arranged.

8. The flat battery according to claim 7, wherein at least one of the current collectors is a preformed metal foil provided with a depression formed in a central portion thereof.

9. The flat battery according to claim 8, wherein the anode comprises lithium as the active material.

10. The flat battery according to claim 8, wherein the cathode comprises manganese-di-oxide ($MnO_2$) as the active material.

11. The flat battery according to claim 2, wherein the first and the second polymeric jacket layers are made of one single sheet which is folded in the middle, thereby forming the outer jacket.

12. The flat battery according to claim 1, wherein an inner peripheral surface of the sealing frame is in direct contact with the cathode, the anode, and the separator layer.

* * * * *